(12) United States Patent
Jara Rodelgo et al.

(10) Patent No.: US 11,446,872 B2
(45) Date of Patent: Sep. 20, 2022

(54) METHOD FOR MANUFACTURING A PART

(71) Applicant: AIRBUS OPERATIONS SL, Madrid (ES)

(72) Inventors: Alvaro Jara Rodelgo, Madrid (ES); Alfonso Parra Rubio, Madrid (ES); Guillermo Hernaiz Lopez, Madrid (ES); Pablo Vazquez Sanchez, Madrid (ES); Enrique Guinaldo Fernandez, Madrid (ES)

(73) Assignee: Airbus Operations SL, Madrid (ES)

( * ) Notice: Subject to any disclaimer, the term of this patent is extended or adjusted under 35 U.S.C. 154(b) by 8 days.

(21) Appl. No.: 17/196,280

(22) Filed: Mar. 9, 2021

(65) Prior Publication Data

US 2021/0276258 A1    Sep. 9, 2021

(30) Foreign Application Priority Data

Mar. 9, 2020    (EP) .................................... 20382168

(51) Int. Cl.
*B29C 64/30*    (2017.01)
*B33Y 10/00*    (2015.01)
(Continued)

(52) U.S. Cl.
CPC ............ *B29C 64/30* (2017.08); *B29C 64/118* (2017.08); *B33Y 10/00* (2014.12); *B33Y 30/00* (2014.12);
(Continued)

(58) Field of Classification Search
CPC ..... B29C 64/30; B29C 64/118; B29C 64/188; B29C 64/295; B29C 64/364; B29C 64/20; B29C 2043/3644; B29C 2043/3647; B29C 43/3642; B29C 2043/3657; B29C 70/342; B33Y 10/00; B33Y 30/00; B33Y 40/20; B33Y 70/10; B33Y 80/00; B29K 2075/00;
(Continued)

(56) References Cited

U.S. PATENT DOCUMENTS

2010/0065717 A1*  3/2010  Wilson .................. B29C 70/342
                                                         52/741.1
2018/0111315 A1    4/2018  Achten et al.
(Continued)

FOREIGN PATENT DOCUMENTS

CN          107 187 020          9/2017

OTHER PUBLICATIONS

Extended Search Report for EP 20382168.1, dated Sep. 8, 2020, 9 pages.

*Primary Examiner* — Nahida Sultana
(74) *Attorney, Agent, or Firm* — Nixon & Vanderhye P.C.

(57) ABSTRACT

A method for manufacturing a part layer-upon-layer using Additive Manufacturing technology, the method including: printing the part together with an elastomeric enclosure shaped thereto leaving a gap free of material therebetween, the elastomeric enclosure including at least one opening; heating the ensemble of the printed part and elastomeric enclosure or keeping an operating printing temperature; applying vacuum by the at least one opening of the elastomeric enclosure so that the elastomeric enclosure deflates thus exerting pressure to the printed part; and maintaining the printed part under vacuum and heat during a predefined time.

19 Claims, 4 Drawing Sheets

(51) Int. Cl.
  *B33Y 30/00*      (2015.01)
  *B29C 64/118*     (2017.01)
  *B33Y 40/20*      (2020.01)
  *B29K 75/00*      (2006.01)
  *B29K 83/00*      (2006.01)
  *B29K 101/12*     (2006.01)
  *B29K 105/06*     (2006.01)

(52) U.S. Cl.
  CPC .......... *B33Y 40/20* (2020.01); *B29K 2075/00* (2013.01); *B29K 2083/00* (2013.01); *B29K 2101/12* (2013.01); *B29K 2105/06* (2013.01)

(58) Field of Classification Search
  CPC ............ B29K 2083/00; B29K 2101/12; B29K 2105/06
  See application file for complete search history.

(56) References Cited

U.S. PATENT DOCUMENTS

| | | | |
|---|---|---|---|
| 2018/0319051 A1* | 11/2018 | Heath | B29C 43/02 |
| 2021/0031901 A1* | 2/2021 | Kron | B23K 26/34 |

* cited by examiner

FIG.4b ically circular cross-sections. The voids typically extend along the printing direction. Another typical local defect is the absence of polymer chain interfusion between adjacent filaments which renders inter-laminar shear strength ('ILSS') very low and results in weak printed parts when subjected to certain stresses. The voids and other printing defects in in an AM printed part may act as stress concentrators causing the part to fail prematurely.

METHOD FOR MANUFACTURING A PART

RELATED APPLICATION

This application claims priority to European Patent Application EP 20382168-1 filed Mar. 9, 2020, the entirety of which is incorporated by reference.

TECHNICAL FIELD

The present invention belongs to the field of manufacturing, in particular to the field of manufacturing parts by using an Additive Manufacturing technology. More specifically, the invention is of special application in the manufacturing of printed parts with complex shapes for structural applications.

BACKGROUND

Historically, aircraft parts with structural applications have been made of aluminum alloys. In recent decades, with the development of composite manufacturing technologies, structural parts have been manufactured with different technologies such as, for instance, co-bonding or co-curing of Carbon Fiber Reinforced Plastic (CFRP) materials.

These manufacturing technologies require components go through different stages to carry out operations to manufacture parts separately that must be later assembled together. This constitutes a time-demanding process predetermining the production rate of aircrafts. As a consequence, the final component is achieved after a series of manufacturing steps that increase the cost and time of fabrication.

The drawback of assembling individual parts and the recurring/non-recurring costs associated to these conventional manufacturing techniques, has been at least partially addressed by Additive Manufacturing (AM) technologies particularly in aeronautics.

AM technologies typically use a computer with 3D modelling software, such as Computer Aided Design (CAD) software, an additive manufacturing (AM) tool, such as a computer controlled 3D printing machine, and filaments of layering material printed by the printing machine. The CAD software is used to generate a 3D electronic model of the 3D object to be printed. The AM tool is reads the 3D electronic mode from a CAD data file (both the cross-section geometry and surface pattern) and prints or otherwise deposits successive filaments to form layers of printed liquid, powder, sheet material or the like. The printing may be by printing the layering material from one or more print heads, e.g., nozzles, from the AM tool.

AM printing techniques can be improved by reducing the buy-to-fly ratio while enabling rapid prototyping. The buy-to-fly ratio is the ratio between mass of material that is required to produce a part and the mass of material in the finished aeronautical structure.

The mechanical properties of printed composite parts tend to be inferior to aluminum parts or composite parts manufactured by conventional techniques which do not involve AM technologies. The mechanical properties of AM technologies are reduced because of defects in printed parts, such as voids, porosity and poor adhesion between contiguous filaments either from the same layer or a different one.

Porosity or voids in a 3D printed part may result from printing, e.g., layering, filaments with substantially circular cross-sections. The voids typically extend along the printing direction. Another typical local defect is the absence of polymer chain interfusion between adjacent filaments which renders inter-laminar shear strength ('ILSS') very low and results in weak printed parts when subjected to certain stresses. The voids and other printing defects in in an AM printed part may act as stress concentrators causing the part to fail prematurely.

To minimize the formation of voids in other defects in AM printing, current solutions provide in situ compaction mechanisms based on a roller that applies pressure to deposited layers against the printing bed in order to mitigate these undesired phenomena. This solution can be easily applied to printed parts of simple geometry or with soft curvatures where rollers can roll extensively and uniformly.

A remarkable characteristics of printing a part layer-upon-layer using Additive Manufacturing (AM) technology the capability to manufacture economically and fast parts with complex geometries. However, the roller-based compaction techniques used to reduce voids and defects is inconsistent with the needs to print parts having complex geometries because the roller deforms the printed material. There is a need for AM technology that prints quickly and reliably parts having complex geometries and requiring good mechanical properties.

SUMMARY

The present invention may be embodied as a solution for the aforementioned problems. The invention may be embodied as a method for manufacturing a part layer-upon-layer using Additive Manufacturing technology.

The invention may be embodied as a method for manufacturing a part layer-upon-layer using Additive Manufacturing (AM) technology, the method comprising the following steps: (i) printing the part within an elastomeric enclosure shaped to leaving a gap free of material between the part and the elastomeric, the elastomeric enclosure comprising at least one opening; (ii) heating the printed part and the elastomeric enclosure or keeping the both at an operating printing temperature; (iii) applying a vacuum through the at least one opening of the elastomeric enclosure so that the elastomeric enclosure deflates and applies pressure to the printed part; and (iv) maintaining the printed part under vacuum and heat for a predefined time.

"Additive Manufacturing technologies" (AM) are technologies that build 3D objects by adding, e.g., printing, layer-upon-layer material, where the material is a meltable material or a matrix material such as reinforced materials are melted or otherwise liquified such as by heating at a print head, printed in layers and solidified, e.g., hardened, after being printed and during cooling.

Many technologies are encompassed within Additive Manufacturing technologies, depending on the form of the material and machine technology used. Among others, it may be pointed out the Selective Laser Sintering (SLS), Stereolithography (SLA), Multi-Jet Modelling (MJM), or Fused Filament Fabrication (FFF).

In an embodiment of the method of the invention, the part and elastomeric enclosure are printed using Fused Filament Fabrication (FFF) which is a particular example of 3D-Printing (3DP). Fused Filament Fabrication (FFF) is a process oriented fabrication technique involving the use of materials in the form of filaments injected through at least one indexing nozzle onto a build sheet. The nozzle(s) trace the surface pattern for each particular layer with the material hardening prior to the deposition of the next layer. The process repeats until the piece is completed. The materials used for printing may be thermoplastic or elastomeric materials; or fibrous material reinforcement embedded within thermoplastic material.

In FFF, each deposited layer may be formed by a set of oriented filaments.

It is to be noted that the process of printing the part together with the elastomeric enclosure is performed by repeating, as many times as necessary, the following steps: (i) depositing at least one layer of the material of the part onto a build sheet, (ii) leaving a gap free of material, and (iii) depositing at least one layer of elastomeric material for an elastomeric enclosure following the shape of the part.

Since the first printed layers, lower layers, of both elastomeric enclosure and printed part are deposited directly on the build sheet and the elastomeric enclosure follows the shape of this printed part, this first printed layer of the elastomeric enclosure forms an edge for at least one opening.

As a result, the elastomeric enclosure entirely surrounds the printed part except for such at least one opening.

Because of the strong dependence on the temperature when forming a bond between adjacent filaments/layers (diffusion-based fusion), typical printing tools pre-heat their printing chambers or the surroundings in order to reach and maintain an operating printing temperature determined by the materials chosen.

Therefore, according to the present invention, there is a step of heating the ensemble formed by the printed part and the elastomeric enclosure resulting from the previous printing step up to an operating temperature. Optionally, the ensemble may be heated and maintained at an operating temperature also during the printing process. The operating temperature may be constant or may be varied along the process.

This operating temperature may be the glass transition temperature of the printed part material to soften the layers and slightly enable shaping. For instance, typical values of glass transition temperature are approx. 143° C. for PEEK (Polyetherketoneketone), 50° C. for PA66 (e.g. nylon), and 105° C. for ABS (Acrylonitrile butadiene styrene). Measuring techniques include: Differential Scanning Calorimetry (DSC), Thermal Mechanical Analysis (TMA) and Image Dynamic Mechanical Analysis (DMA). Although the precise value of glass transition temperature depends on the measuring technique, all the known results provide values similar enough as to apply the present invention. Thus, the operating temperature may be in a range of 90% to 110% as measured by DMA.

A further step of the present invention is, by air-tightly communicating a vacuum system to the at least one opening of the elastomeric enclosure, applying vacuum to the ensemble so that air is removed from the gap between the printed part and the elastomeric enclosure causing the latter to deflate.

Thanks to the elastomeric enclosure being shaped to the printed part, this vacuuming produces the elastomeric enclosure to exert pressure to the printed part thus acting as an in situ printed hot-forming membrane or vacuum bag for consolidation.

For the term "enclosure" should be understood that per each wall of the printed part (either inner or outer), there is a corresponding wall of elastomeric material distanced by the gap. Only when an inner wall of the printed part is not open to the exterior (for instance, intentionally introduced voids for weight lightening of the part), the elastomeric material does not cover such wall for the impossibility to, firstly, apply vacuum and, secondly, to afterwards remove the elastomeric material.

If this combination of operating temperature and vacuum is maintained for a predefined time, the printed part is deemed consolidated just after.

Advantageously, elastomeric materials are flexible and stretchable enough to modify their geometry under vacuum and heat, thus covering tightly the printed part. In particular, it has been found that elastomeric materials printed as enclosures can be easily inflated and deflated without damages then being specially suitable to apply pressure (i.e. compaction) to the printed part and improve its mechanical properties.

Further, thanks to the inherent inflation/deflation characteristics of flexible elastomeric materials, the printed part can be easily removed from this enclosure without damage.

As mentioned, as the part is made of polymeric materials, heat softens adequately the printed part and compaction mitigates voids between filaments thus promoting polymer interfusion to improve inter-layer mutual adhesion. As a result, not only mechanic properties such as ILSS, tensile strength, compression strength, etc. of the printed parts are highly improved but also dimensional tolerances. Collaterally, any warping effect is therefore eliminated.

Advantageously, since the elastomeric enclosure is progressively printed as the part to be consolidated is also printed, i.e. they are printed 'together' or at the same time, there is no restriction to the shape or geometry of the printed part.

In short, the consolidated printed parts manufactured by the method according to the invention have, compared to conventionally printed parts, high-resolution surfaces, less porosity volume or voids and no interfaces.

For instance, aeronautical parts conventionally made in pieces and then assembled together (thus having interfaces) can be manufactured integrally in one-shot meeting any structural specification.

The printed part may be an aeronautical part.

This last remarkable feature of no interfaces (i.e. integral or self-sealed) of parts manufactured according to the present invention has additional advantages, such as the improvement against water ingestion issues and de-bonding. Also, there may be an operation enhancing as the printed part has a better structural behavior.

In a particular embodiment, the method further comprises the following steps: (i) cooling down the ensemble of printed part and elastomeric enclosure at a predefined cooling speed; and (ii) removing the printed part from the elastomeric enclosure either manually or by applying air through the gap therebetween.

The cooling down (normally defined in terms of ° C./min) of the consolidated printed part from the operating temperature leads to its solidification and, therefore, has an impact on its final mechanical features as the material shrinks and internal stresses starts to appear.

If cooling speed is slow enough, residual thermal stresses on the printed part are mostly avoided. Proper cooling speeds are case-dependent and generally account for both the type of material and its geometry, being a typical value around 16° C./min or below.

Cooling down is normally performed by convection either gradually deactivating the heating means or by shutting down it and then applying cooling air.

In an embodiment of the invention, the cooling speed is selected according to the printed part material in order to achieve a degree of crystallization of at least 32%.

Semi-crystalline polymers, contrary to amorphous polymers, comprise an ordered arrangement of their polymeric molecular chains, in particular these chains tend to align further entailing a more compacted printed part.

Thus, the final consolidation is produced in this embodiment by the combination of thermomechanical and crystallization effects widening the possible mechanical properties of final products.

Promoting a certain degree of crystallization in the printed product advantageously improves the mechanical properties imparted thereto.

Once the printed part is cooled, for instance to ambient temperature, the ensemble can be removed from the printing tool (if still there) and further removal of the printed part from the elastomeric enclosure may be performed either manually or, disconnecting the vacuum system, and connecting a compressed air system for applying air through the gap.

Due to the flexible properties of the elastomeric materials, this removal may be performed without damage as it inflates easily.

It is to be noted that, once cooled, it is not necessary to immediately remove the elastomeric enclosure as it can play a cushion protection for the printed part during storage.

In an embodiment of the invention, the elastomeric enclosure is made of silicone rubber and/or elastomeric polyurethane.

Advantageously, these elastomeric materials are flexible and elastic materials that may be printed according to the part geometry surrounding it. Preferably, the elastomeric enclosure is printed taking into consideration the expected deformation and/or adaptation capacity.

In a preferred embodiment, the printed part is made of fibrous material reinforcement embedded within meltable material.

By depositing fibrous material reinforcement with meltable material, a lightweight design is achieved because less amount of material is needed to meet the structural requirement compared to using solely meltable material.

According to an embodiment of the invention, the fibrous material reinforcement may be in the form of fibrils (very short and/or irregular fibers), nanofibers, carbon fillers, short fibers (length<1 mm), or continuous fibers (extended continuously along the whole filament and thus along the whole length/width of the part when manufactured), for example. Preferably, the fibrous material reinforcement is in the form of continuous fibers and/or short-fibers, wherein continuous fibers are preferred.

Additionally, the fibrous material reinforcement may be glass, carbon, polymer fibers or any other conventional material used as reinforcement. Among them, carbon is preferred.

According to the invention, the meltable material may be a thermoplastic material such as PA (Polyamide), PA66, ABS (Acrylonitrile butadiene styrene), PEEK (Polyether ether ketone), PAEK (Polyaryletherketone) or PEKK (Polyetherketoneketone). In a preferred embodiment, the meltable material is in the form of a filament for better storing and handling.

In a preferred embodiment, the meltable material is a thermoplastic material of any of the following: PEKK, PAEK, or PEEK. More preferably the meltable material is PAEK or PEEK. And most preferably the meltable material is PEEK.

In an embodiment of the invention, this fibrous material reinforcement is deposited to better suit future load requirements during operation and service. Therefore, an optimized structural arrangement is achieved.

In a particular embodiment, the elastomeric enclosure comprises at least one outer rib formed by an excess of elastomeric material.

That is, the elastomeric enclosure is printed to have at least one outer rib configured and arranged so that the pressure exerted to the printed part under vacuum for consolidation accounts for the mechanical properties to be imparted on the printed part.

When vacuum is applied, the elastomeric material deflates by removing the air between itself and the printed part and compacts the latter. As compaction cannot be applied in the three axes, for further mechanical properties optimization, the elastomeric enclosure can be designed accounting for the envisaged mechanical properties the printed part is to have.

In particular, agglomeration of elastomeric material at both sides of a wall of the printed part provides higher pressure to be exerted locally and, thus, compaction may be applied regarding expected load requirements during operation and service.

Since AM techniques enable both to vary the thickness of the elastomeric enclosure and the provision of ribs (understood as local agglomeration of elastomeric material), compaction may likewise vary locally depending on expected mechanical properties. Similarly, for complex geometries, controlling the direction of pressure exerted, a more uniform consolidation can be achieved.

In a particular embodiment, the part and the elastomeric enclosure are printed onto a porous build sheet, this porous build sheet being connected to a vacuum system for applying vacuum.

Conventional Additive Manufacturing tools for printing layer-upon-layer parts comprise a printing chamber housing a build sheet and at least one head configured to be moved over said build sheet and to deposit material.

The conventional build sheet can be replaced by a porous build sheet, or this porous build sheet may be placed over the conventional build sheet. Either way, in this embodiment a vacuum system is connected beneath in order to apply vacuum at least through the at least one opening of the elastomeric enclosure.

Advantageously, printed parts can be consolidated in situ just after being printed by hermetically closing the printing chamber (if not closed yet) and, then, activating the vacuum system for the predetermined time.

Advantageously, the method according to the invention can be easily implemented in conventional Additive Manufacturing tools such as FFF printers.

In an embodiment of the invention, the ensemble of printed part and elastomeric enclosure is maintained at the operating temperature inside the printing chamber.

Since vacuuming may be performed immediately after printing, the printing chamber is already at operating temperature so the heaters therein simply have to maintain such a temperature for the predetermined time for compaction.

In a particular embodiment, the method further comprises the following steps: (i) printing layer-upon-layer an elastomeric connecting piece configured to air-tightly connect with the at least one opening of the elastomeric enclosure, wherein said elastomeric connecting piece is printed either together with the part and the elastomeric enclosure, or in a separate printing step; and the step of applying vacuum further comprises: air-tightly connecting the elastomeric connecting piece with the at least one opening of the elastomeric enclosure; and connecting the vacuum system to said elastomeric connecting piece.

That is, the elastomeric connecting piece is printed in situ and ad hoc according to the geometry of the printed part and, specifically, according to the at least one opening of the elastomeric enclosure. An excess of non-structural material is printed for acting as vacuum connection between the elastomeric enclosure opening and the valve of the vacuum system.

Similarly, based on the same CAD file, if the printing chamber is not big enough so as to print this connecting piece and the ensemble at the same time, the elastomeric connecting piece can be printed in a separate printing step.

Either way, the elastomeric connecting piece comprises a first connecting point shaped to the least one opening of the elastomeric enclosure, and further comprises at least one second connecting point configured to allocate thereon one or more vacuum valves of the vacuum system.

Then, according to the invention, the elastomeric connecting piece is air-tightly connected by the first connecting point to the at least one opening of the elastomeric enclosure; and connected by the second connecting point to the vacuum system.

Advantageously, conventional external vacuum systems can be used with the present invention.

As mentioned, for an effective compaction, the printed part needs to be warm enough, preferably above its glass transition temperature. Then, an option is to introduce a vacuum connection inside the printing chamber and perform the compaction there.

Alternatively, once the part and the elastomeric enclosure are printed, the method further comprises the step of moving them to an oven or an autoclave in order to be maintained at the required operating temperature therein.

In a second inventive aspect, the invention provides a compaction system for a printed part manufactured layer-upon-layer using Additive Manufacturing technology, wherein the system comprises: (i) an elastomeric enclosure printed layer-upon-layer together with the part and adapted to be shaped thereto leaving a gap therebetween, wherein this enclosure comprises at least one opening; (ii) heating means configured to heat and maintain an ensemble of the printed part and elastomeric enclosure at an operating printing temperature; (iii) means to apply vacuum by the at least one opening of the elastomeric enclosure, and (iv) a controller, wherein the controller is configured to operate the means to apply vacuum and the heating means simultaneously at least during a predefined time so that the elastomeric enclosure deflates thus exerts pressure to the printed part.

Advantageously, conventional additive manufacturing printing tools such as FFF printers can be improved by including this compaction system.

If this combination of operating temperature and vacuum is maintained for a predefined time, the printed part is deemed consolidated or compacted just after.

In an embodiment, the compaction system further comprises the printed part.

The heating means may be arranged inside the printing chamber where the printed part and the elastomeric enclosure are to be printed. In this embodiment, the controller may be the same incorporated on the printing chamber that coordinates the movement of the head and/or build sheet.

The heating means may also be an oven or an autoclave. In this embodiment, the controller may be a software-based component coordinating the temperature of the oven/autoclave with the vacuum applied by the vacuum system.

In a particular embodiment, the means to apply vacuum comprises a porous build sheet whereon the printed part and the elastomeric enclosure are printed, and a vacuum system connected to such porous build sheet.

In an alternative embodiment, the means to apply vacuum comprises an elastomeric connecting piece configured to air-tightly connect with the at least one opening of the elastomeric enclosure and a vacuum system connected thereto.

In this embodiment, this means to apply vacuum may further comprise an air-tight seal at the connection between the elastomeric connecting piece and the at least one opening of the elastomeric enclosure to ensure air-tightness.

For an effective compaction, in a particular embodiment, the elastomeric enclosure comprises at least one outer rib arranged so that the pressure exerted to the printed part under vacuum for consolidation accounts for the mechanical properties to be imparted on the printed part.

In a third inventive aspect, the invention provides an additive manufacturing tool for printing layer-upon-layer using Additive Manufacturing technology a printed part and consolidating such printed part, the additive manufacturing tool comprising: (i) a printing chamber housing a build sheet and at least one head configured to be moved over said build sheet and to deposit material for the printed part and/or elastomeric material; and (ii) a compaction system according to any of the embodiments of the second inventive aspect.

The additive manufacturing tool according to this third inventive aspect that can be used in the method according to any of the embodiments of the first inventive aspect comprises a printing chamber, preferably a hermetically closable printing chamber.

Inside that printing chamber, it is arranged the build sheet and the at least one head. This build sheet may be planar or curved reproducing any external surface of the product to be printed.

The at least one head is configured to be moved over the build sheet and to deposit at the same time a material stored tracing the surface pattern for each particular layer with the material hardening prior to the application of a subsequent layer.

If material in form of filaments is used, the tool may further comprise spool(s) for storing either the meltable material for the part and separately the fibrous material reinforcement, or fibrous material reinforcement already embedded within meltable material, or even elastomeric material. Preferably all in a filament form.

The material stored in the spool is led to the head(s). The head additionally comprises an extruder which uses torque and pinch systems to feed and retract the material fed, in order to drive the required amount of material to be deposited. The head(s) may also comprise a heater block for heating the meltable material or elastomeric material up to any precise temperature. Once the material is heated, it is forced out of a nozzle by a reduction in its diameter letting the material to be deposited more accurately.

The additive manufacturing tool may have either one head configured to deposit meltable material for the part and/or elastomeric material, and another head configured to deposit fibrous material reinforcement to be embedded within meltable material, or only one head configured to switch the material to be deposited. Alternatively, the additive manufacturing tool has one head configured to deposit meltable material for the part and another head to deposit elastomeric material.

Furthermore, fibrous material reinforcement may be embedded with the material for the part: (i) previously to entering the head (similar to pre-impregnated composites), or (ii) in situ in the head, or (iii) in situ over the component, depositing the fibrous material reinforcement and the meltable material separately and once deposited, applying heat to melt the meltable material.

In an embodiment, the head is configured to be moved over the build sheet in the three-translational axes (X, Y, Z) and/or rotations (around X, Y, Z) for printing more complex geometries. Optionally, the head(s) may be limited to move over the build sheet just in horizontal directions (X, Y) while the movement in vertical Z-direction is performed by the build sheet, thus implementing the so-called 2.5D fabrication. These movements are typically performed by actuators and/or servos, one for each direction and/or rotations.

In a fourth inventive aspect, the invention provides a part manufacturable layer-upon-layer using Additive Manufacturing technology according to any of the embodiments of the first inventive aspect. In a preferred embodiment, the part is an aeronautical part.

All the features described in this specification (including the claims, description and drawings) and/or all the steps of the described method can be combined in any combination, with the exception of combinations of such mutually exclusive features and/or steps.

The invention may be embodied as a method comprising: (i) applying additive manufacturing to print a part; (ii) applying the additive manufacturing to print an enclosure for the part, wherein the enclosure is printed from an elastomeric print filament and the enclosure is printed to have an inside surface shaped to conform to an outer surface of the part with a gap between the outer surface of the part and the inside surface of the enclosure; (iii) maintaining the part and the elastomeric enclosure at an operating temperature; (iv) applying a vacuum to the gap to collapse the enclosure onto the outer surface of the part while the part is at the operating temperature; and (v) for a determined period, maintaining the vacuum to cause the collapsed enclosure to press against the outer surface of the part while also maintaining the part at the operating temperature. The collapsed enclosure may compact the part to remove voids or other printing defects from the part. The method may include removing the collapsed enclosure from the part.

The operating temperature may be a temperature range of 90% to 110% of a glass transition temperature of the material forming the part, wherein the glass transition temperature is determined using Dynamic Mechanical Analysis.

DESCRIPTION OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

FIGS. 5a, 5b and 5c show a cut views of a cylindrical printed part with the corresponding elastomeric enclosure and, further, an elastomeric connecting piece in three instants: (FIG. 5a) just after being printed, (FIG. 5b) assembled, and (FIG. 5c) after disconnecting the vacuum system.

DETAILED DESCRIPTION

A person of ordinary skill in the art will recognize that aspects described herein can be embodied as a method for manufacturing a part (1), a compaction system or as an additive manufacturing tool.

The invention defines a method for manufacturing a part (1) layer-upon-layer using Additive Manufacturing technology. Basically, the method comprises the following steps: (i) printing the part (1) together with an elastomeric enclosure (2) shaped thereto leaving a gap free of material therebetween, the elastomeric enclosure comprising at least one opening (2.1); (ii) heating the ensemble of the printed part (1) and elastomeric enclosure (2) or keeping an operating printing temperature; (iii) applying vacuum by the at least one opening (2.1) of the elastomeric enclosure (2) so that the elastomeric enclosure deflates thus exerting pressure to the printed part (1); and (iv) maintaining the printed part (1) under vacuum and heat during a predefined time.

Figure 1:
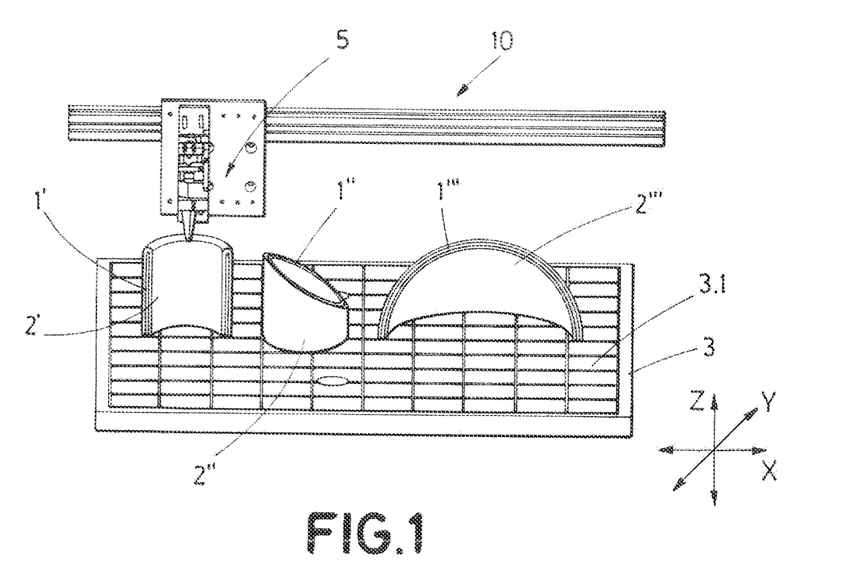
FIG. 1 shows an example of an additive manufacturing tool with printed parts of different geometries.

FIG. 1 depicts an embodiment of an additive manufacturing tool (10) according to an aspect of the present invention with a set of printed parts (1', 1'', 1''') of different geometries.

For illustrative reasons, the printing chamber is not shown. Nevertheless, this printing chamber typically houses a build sheet (3.1) and head(s) (5) that can move horizontally (X, Y) over such build sheet (3.1). The movement in vertical Z-direction is performed by the build sheet as in 2.5D fabrication.

During printing step, layers of material are deposited on this build sheet (3.1). In addition this build sheet is a porous build sheet capable of extracting air, e.g., transmitting a vacuum, therethrough.

Figure 2:
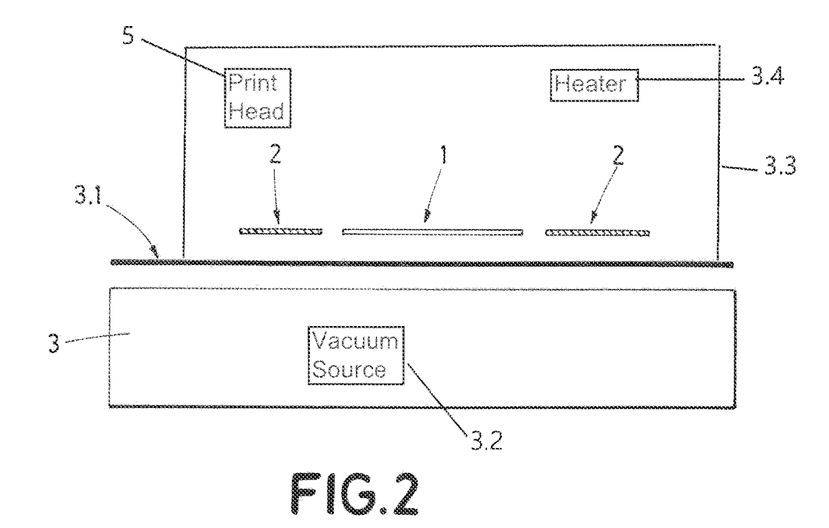
FIG. 2 is a schematic representation of an additive manufacturing tool wherein the first layer of both the part and the elastomeric enclosure have been printed.

To apply a vacuum, the porous build sheet (3.1) is connected to a conventional vacuum system (3.6) arranged in a support base (3) for the print chamber (3.3) and the build sheet (3.1), as shown in FIG. 2.

The printing chamber (3.3) houses a heating device (3.4), such as resistors for heating up and maintaining the inside at an operating temperature both during printing and compaction steps. A controller (3.5) may be a computer system executing computer code to control the print head (5) to print the composite/polymeric part (1) and the elastomeric enclosure (3) based on a computer file that defines the shape of the part and enclosure and the materials used to form the part and enclosure. The controller (3.5) may also be configured to control the heater (3.4) and vacuum source (3.2) to maintain the part and enclosure at an operating temperature while the vacuum source removes air from the gap and causes the enclosure to collapse onto the part.

These printing and compacting operating temperatures can be identical or different. Therefore, if different, the heating means are configured to warm and maintain the inside of the printing chamber up to at least the highest temperature, which usually is the operating temperature above the glass transition temperature of the material for the printed part. Otherwise, two different heaters or heating means can be provided for each step.

Thanks to the additive manufacturing tool having incorporated the vacuum system (3.6) and vacuum transmission means (3.2) through the porous build sheet (3.1) as well as the heating systems, the steps of printing, heating and vacuuming may be performed subsequently and in situ within the printing chamber.

As a result, parts (1', 1", 1''') are printed simultaneously than an elastomeric enclosure (2', 2", 2''') shaped thereto but distanced by a small gap. The geometries shown in FIG. 1 are a semi-cylinder (1', 2'), a tubular profile (1", 2"), and a quarter of a sphere (1''', 2''').

These basic geometries are for illustration purposes and the method according to the invention can be extended to any other geometry regardless how complex it may be. In fact, the present invention is of special application to such geometries of printed parts too complex so as to be compacted by conventional means.

As mentioned, regardless how pronounced the curvature of an outer wall of the printed part (1) can be, there shall be always a corresponding wall of elastomeric enclosure (2) distanced by the gap unless that wall of the printed part is not open to the exterior such as in the case of internal voids.

FIG. 2 depicts schematic representation of an embodiment of an additive manufacturing tool (10) alike the one shown in FIG. 1 wherein the first layer of both the part (1) and the elastomeric enclosure (2) have already been printed.

The process of printing the part (1) together with the elastomeric enclosure (2) is performed by repeating, as many times as necessary, the following steps: (i) depositing at least one layer of the material of the part (1) onto the build sheet, (ii) leaving a gap free of material, and (iii) depositing as many layers of elastomeric material (2) as intended walls of the part for the elastomeric enclosure.

A first layer of the part (1) is surrounded by layers for the elastomeric enclosure (2) that follow the shape of the part is printed directly on the build sheet, e.g. a porous build sheet (3.1). This printed layer of the part (1) will form an edge with two exposed sides such as a cylinder wall.

These printed layers of the elastomeric enclosure (2) at both sides of the first layer of the part will then form an edge of an opening (2.1) through which air may escape by vacuuming.

Figure 3A:
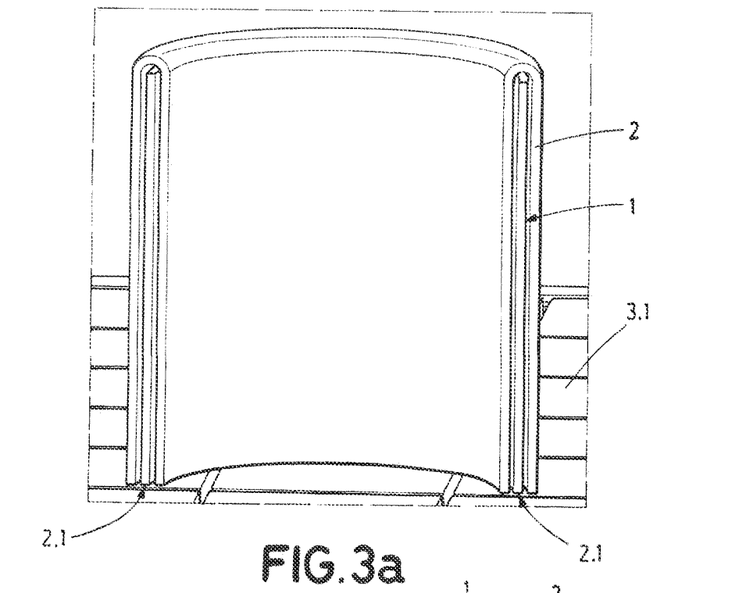
FIGS. 3a and 3b are a cut view of (FIG. 3a) a cylindrical printed part and (FIG. 3b) a semi-spherical printed part with their respective elastomeric enclosures.
Figure 3B:
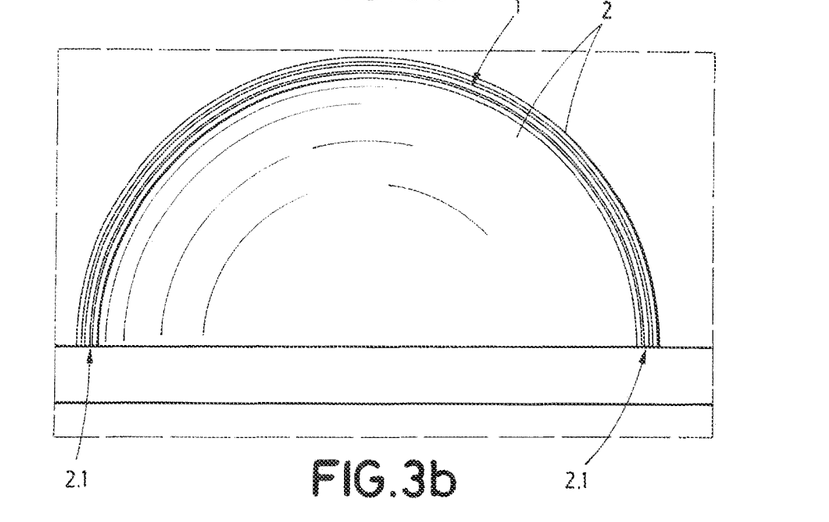

If further layers are deposited layer-by-layer, the printing process will give rise to a printed part (1) and an elastomeric enclosure (2) as those depicted in FIGS. 3a and 3b.

In particular, these FIGS. 3a and 3b show a cut view of a cylindrical printed part (1) and a semi-spherical printed part (1), each one with its ad hoc printed elastomeric enclosure (2).

The elastomeric enclosure (2) and the composite/polymeric part (1) can be printed together in a similar way as it may be done in a conventional printer. In conventional printing processes (for instance 2.5D), the height of the ensemble formed by the part and the elastomeric enclosure is the same for each deposition step so that both pieces are printed 'together'. That is, at any printing step, the part (1) and the elastomeric enclosure (2) may have the same or similar number of layers deposited to avoid the printing head collide any printing piece.

Regarding a cylindrical geometry of the part (1) (FIG. 3a), at the end of the printing process and taking into consideration that the printed part (1) is open in one or more faces, it is thus important to join the inner and outer walls of the elastomeric material (2) to provide a closing (leaving also a gap) with the part (1) in all open areas except those in direct contact with the build sheet. Then, it allows removing the air inside the gap through the open area (2.1) in the bottom of the ensemble during the vacuuming process for compacting the piece.

In case of a spherical geometry of the part (1) (FIG. 3b), the process remains the same as explained for FIG. 3a but finishing the printing process results in the part being closed so it is not necessary—and possible—to join inner and outer walls of the elastomeric enclosure (2). Therefore, both elastomeric enclosure walls (2), inner and outer, are also closed to avoid air escapes.

Figure 4A:
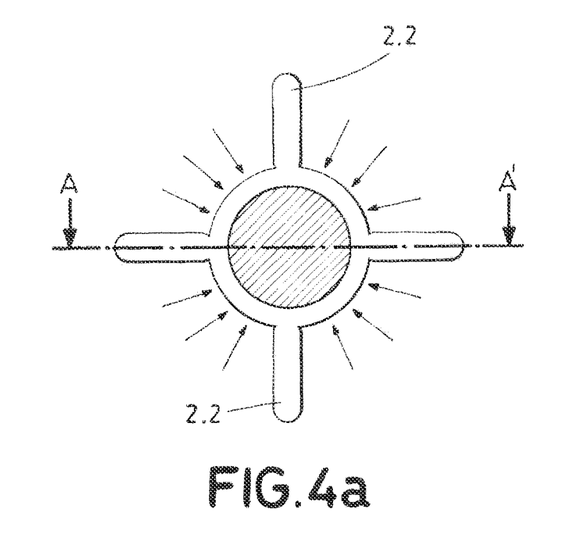
FIGS. 4a and 4b a plan view and a cut view, respectively, of a cylindrical printed part wherein the corresponding elastomeric enclosure further comprises at least one outer rib for local compaction control.
Figure 4B:
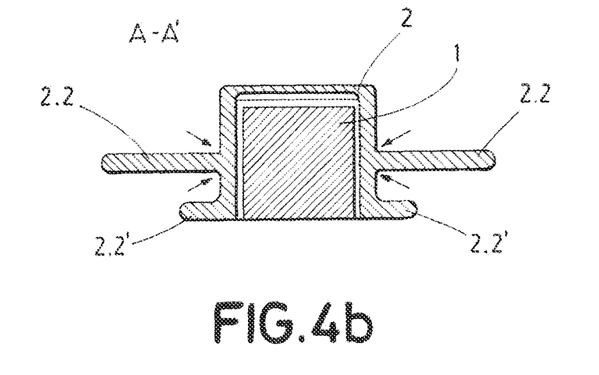

FIGS. 4a and 4b depicts a plan view and a cut view (A-A'), respectively, of a cylindrical printed part (1) wherein the corresponding elastomeric enclosure further comprises rib(s) (2.2, 2.2') for local compaction control.

As it can be observed, this elastomeric enclosure (2) comprises ribs such as a seating ledge (2.2') for providing a stable base when vacuum is applied, for instance through the porous build sheet, and four radial projections (2.2) at mid-height distributed homogeneously, that is, each 90°.

Further, elastomeric material agglomerations at both sides of a part wall may act similarly thus providing higher pressure exerted locally compared to constant thickness and, thus, compaction may be applied regarding expected load requirements during operation and service.

As compaction cannot be applied in the three axes (X, Y, Z), the elastomeric enclosure (2) needs to be designed accounting for the envisaged mechanical properties that the printed part (1) is to have. Regarding a cylindrical geometry, for instance as in FIG. 3a, arrows have been depicted herein to show how these ribs modify compaction directions providing substantially radial forces on the cylindrical part. In particular, more uniform pressure is exerted radially as the ribs may avoid any undesired wrinkle formation.

Figure 5A:
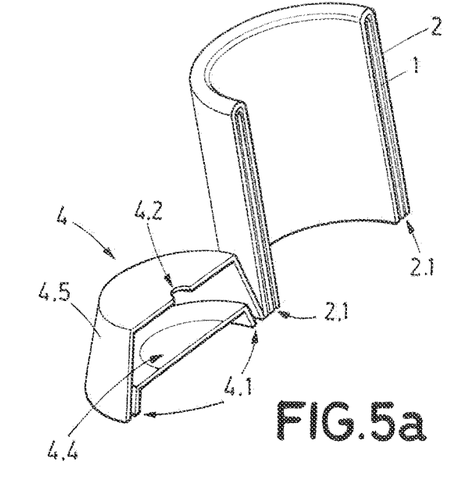
Figure 5B:
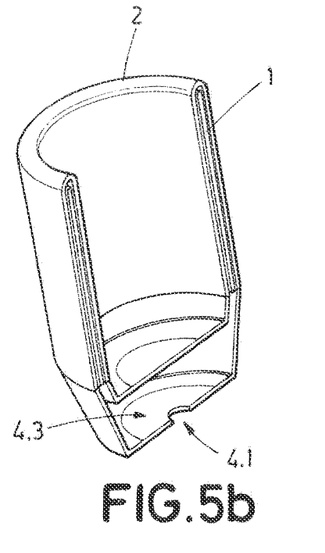
Figure 5C:
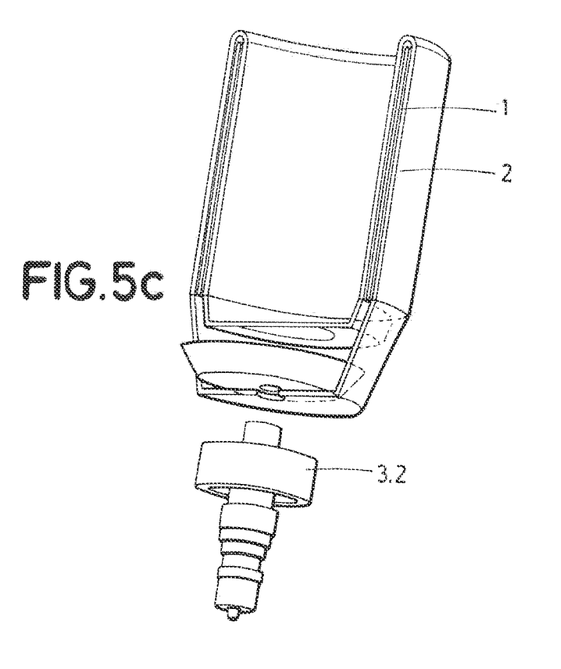

FIGS. 5a to 5c depict a cut view of a cylindrical printed part (1) with the corresponding elastomeric enclosure (2) and, further, an elastomeric connecting piece (4).

The cylindrical printed part (1) may be equal to those depicted in FIG. 3a or 4a. The elastomeric connecting piece (4) is an excess of non-structural flexible elastomeric material which permits to allocate vacuum valves (3.2) to the opening (2.1) of the elastomeric enclosure (2) in order to apply vacuum by means of an external source.

This elastomeric connecting piece (4) comprises a first connecting point (4.1) shaped to the least one opening (2.1) of the elastomeric enclosure (2), and further comprises at least one second connecting point (4.2) configured to allocate thereon the vacuum valve(s) (3.2) of the vacuum system (3). In this particular example, only one valve (3.2) is used.

Then, according to the invention, the elastomeric connecting piece (4) is air-tightly connected by the first connecting point (4.1) to the at least one opening (2.1) of the elastomeric enclosure (2); and connected by the second connecting point (4.2) to the vacuum system (3) (not shown).

As seen in FIG. 5a, the elastomeric connecting piece (4) can be printed in situ and ad hoc according to the geometry of the printed part (1) and, specifically, according to the at least one opening (2.1) of the elastomeric enclosure (2).

Then, as seen in FIG. 5b, this elastomeric connecting piece (4) is assembled to the ensemble by air-tightly connecting its first connecting point (4.1) to the at least one opening (2.1) of the elastomeric enclosure.

It is also noted that this elastomeric connecting piece (4) is formed in this embodiment by two superposed cups, inner (4.4) and outer (4.5), forming a reservoir (4.3) for inserting a mushroom-type sealant counterpart. The outer cup (4.5) comprises the second connecting point (4.2) in form of a through hole to insert thereon a vacuum valve (3.2) of the vacuum system (3.6). In addition, the rims of the inner (4.4)

and outer (4.5) cups form the first connecting point (4.1) adapted to the opening (2.1) of the elastomeric enclosure.

During assembling, an air-tight seal may be necessary at the connection between the elastomeric connecting piece (4) and the at least one opening (2.1) of the elastomeric enclosure to ensure air-tightness. This air-tight seal is preferably a gum sealant tape or other similar tapes as those conventionally used in vacuum systems.

FIG. 5*c* depicts the situation after compacting, wherein the ensemble (1, 2) is still assembled to the elastomeric connecting piece (4) just after disconnecting the vacuum system valve (3.2). It can be further seen the mushroom-type sealant counterpart inserted into the reservoir (4.3) to cooperate with the vacuum valve (3.2) and improve vacuuming.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for manufacturing a part layer-upon-layer using Additive Manufacturing technology, the method comprising:
    printing the part together with an elastomeric enclosure shaped to conform to the part and leaving a gap free of material between the part and the elastomeric enclosure, wherein the elastomeric enclosure includes at least one opening;
    heating the printed part and the elastomeric enclosure or maintaining the printed part and the elastomeric enclosure at or above an operating temperature;
    applying a vacuum to the gap via the at least one opening to collapse the elastomeric enclosure onto printed part; and
    maintaining the vacuum on the elastomeric enclosure and the printed part at or above the operating temperature for a determined period.

2. The method for manufacturing according to claim 1, further comprising:
    cooling the printed part and the elastomeric enclosure at a cooling speed selected to achieve a degree of crystallization of at least 32% in the printed part; and
    after the cooling, removing the printed part from the elastomeric enclosure either manually or by applying air through the gap therebetween.

3. The method for manufacturing according to claim 1, wherein the elastomeric enclosure comprises at least one outer rib formed by an elastomeric material excess.

4. The method for manufacturing according to claim 1, wherein the part and the elastomeric enclosure are printed onto a porous build sheet, and the porous build sheet is connected to a vacuum system configured to apply the vacuum to the elastomeric enclosure and part on the porous build sheet.

5. The method for manufacturing according to claim 1, wherein the part and elastomeric enclosure are maintained at or above the operating temperature inside a printing chamber.

6. The method for manufacturing according to claim 1, further comprising printing layer-upon-layer to form an elastomeric connecting piece configured to form an air tight connection with the at least one opening of the elastomeric enclosure, and
    the step of applying the vacuum comprises:
        forming an air tight connection between the elastomeric connecting piece and the at least one opening of the elastomeric enclosure; and
        connecting the vacuum system to the elastomeric connecting piece.

7. The method for manufacturing according to claim 6, further comprising after the printing of the part and the elastomeric enclosure, moving the part and the elastomeric enclosure to an oven or an autoclave wherein the heating step is performed.

8. The method for manufacturing according to claim 1, wherein a printing material for printing the elastomeric enclosure is a silicone rubber and/or an elastomeric polyurethane.

9. The method for manufacturing according to claim 1, wherein a printing material for the printed part is a composite of a fibrous material and a reinforcing material.

10. A compaction system for a printed part manufactured layer-upon-layer using Additive Manufacturing technology, wherein the system comprises:
    an elastomeric enclosure printed layer-upon-layer together with the printed part, wherein the elastomeric enclosure encloses the printed part and the elastomeric enclosure has an inside surface conforming to an outside surface of the printed part, and a gap is between the inside surface of the elastomeric enclosure and the outside surface of the printed part;
    a heater configured to heat and maintain the printed part and the elastomeric enclosure at an operating temperature;
    a vacuum system configured to apply a vacuum through an to the gap, and
    a controller configured to control the vacuum system to apply a vacuum to the gap and collapse the elastomeric enclosure onto the printed part, and to control the heater to heat the elastomeric enclosure and printed part while the vacuum is applied to the gap.

11. The compaction system according to claim 10, wherein the elastomeric enclosure comprises at least one outer rib.

12. The compaction system according to claim 10, wherein the heater is in a printing chamber where the printed part and the elastomeric enclosure are printed, in an oven and/or in an autoclave.

13. The compaction system according to claim 10, further comprising a porous build sheet whereon the printed part and the elastomeric enclosure are printed, and the vacuum source applies the vacuum to the gap through the porous build sheet.

14. The compaction system according to claim 10, wherein the elastomeric enclosure includes an elastomeric housing configured to enclose the part and an elastomeric connecting piece configured to form an airtight connection between the gap and the vacuum system.

15. The compaction system according to claim 14, wherein the vacuum system includes an air-tight seal at a connection between the elastomeric connecting piece and the at least one opening of the elastomeric enclosure.

16. A method comprising:
   applying additive manufacturing to print a part;
   applying the additive manufacturing to print an enclosure for the part, wherein the enclosure is printed from an elastomeric print filament and the enclosure is printed to have an inside surface shaped to conform to an outer surface of the part with a gap between the outer surface of the part and the inside surface of the enclosure;
   maintaining the part and the elastomeric enclosure at an operating temperature;
   applying a vacuum to the gap to collapse the enclosure onto the outer surface of the part while the part is at the operating temperature; and
   for a determined period, maintaining the vacuum to cause the collapsed enclosure to press against the outer surface of the part while also maintaining the part at the operating temperature.

17. The method of claim 16 wherein the collapsed enclosure compacts the part to remove voids or other printing defects from the part.

18. The method of claim 16 further comprising removing the collapsed enclosure from the part.

19. The method of claim 16, wherein the operating temperature is a temperature range of 90% to 110% of a glass transition temperature of the material forming the part, wherein the glass transition temperature is determined using Dynamic Mechanical Analysis.

\* \* \* \* \*